United States Patent

Sato et al.

[11] Patent Number: 5,248,190
[45] Date of Patent: Sep. 28, 1993

[54] HYDRAULIC BRAKING PRESSURE CONTROL SYSTEM FOR VEHICLE

[75] Inventors: Makoto Sato; Hiromi Inagaki; Wataru Saito; Kazuya Sakurai, all of Saitama; Koichi Hagiwara; Makoto Horiuchi, both of Nagano, all of Japan

[73] Assignee: Honda Giken Kogyo Kabushiki Kaisha, Ueda, Japan

[21] Appl. No.: 744,184

[22] Filed: Aug. 9, 1991

[30] Foreign Application Priority Data

Aug. 10, 1990 [JP] Japan .................. 2-213374

[51] Int. Cl.$^5$ .......................................... B60T 8/34
[52] U.S. Cl. ...................... 303/113.4; 303/115.4; 364/426.02
[58] Field of Search ............. 303/113 SS, 116 R, 117, 303/115 PP, 113 TR, 119 R; 364/426.02

[56] References Cited

U.S. PATENT DOCUMENTS

| | | | |
|---|---|---|---|
| 4,365,847 | 12/1982 | Martin | 303/93 |
| 4,753,490 | 6/1988 | Belart et al. | 303/115 PP |
| 4,950,028 | 8/1990 | Harrison | 303/113 TR |
| 4,957,330 | 9/1990 | Morikawa et al. | 303/115 PP |
| 4,971,400 | 11/1990 | Jonner | 303/113 TR |

FOREIGN PATENT DOCUMENTS

| | | |
|---|---|---|
| 0348270 | 12/1989 | European Pat. Off. |
| 236859 | 11/1985 | Japan ............. 303/115 PP |
| WO90/12718 | 11/1990 | PCT Int'l Appl. |
| 2169975A | 7/1986 | United Kingdom. |
| 2170286A | 7/1986 | United Kingdom. |
| 2194010A | 2/1988 | United Kingdom. |
| 2215416A | 9/1989 | United Kingdom. |
| 2225397A | 5/1990 | United Kingdom. |

Primary Examiner—Robert J. Oberleitner
Assistant Examiner—Lee W. Young
Attorney, Agent, or Firm—Armstrong, Westerman, Hattori, McLeland & Naughton

[57] ABSTRACT

A hydraulic braking pressure control system for a vehicle comprises a master cylinder (M) operatively connected to a brake pedal (P), an operation-amount detector (S) for detecting the amount by which the brake pedal is operated, a hydraulic pressure control unit ($2_{FL}$ etc.) for controlling the hydraulic pressure to be applied to a brake device ($B_{FL}$ etc.) mounted on a wheel in accordance with an applied quantity of electricity, and a control circuit (3) for controlling the quantity of electricity to be applied to the hydraulic pressure control unit, in accordance with a detection value provided by the operation-amount detector. The system further includes a cut-off valve ($30_{FL}$ etc.) adapted to be closed in response to depression of the brake pedal, and a reservoir ($R_2$) connected through the cut-off valve to an oil passage (27) connecting the hydraulic pressure control unit and the brake device. The cut-off valve is opened when the brake pedal is not depressed, and even if a hydraulic pressure is delivered from the hydraulic pressure control unit when there is no braking operation, such hydraulic pressure can be released into the reservoir, ensuring that any such hydraulic pressure is prevented from being applied to the brake device.

6 Claims, 1 Drawing Sheet

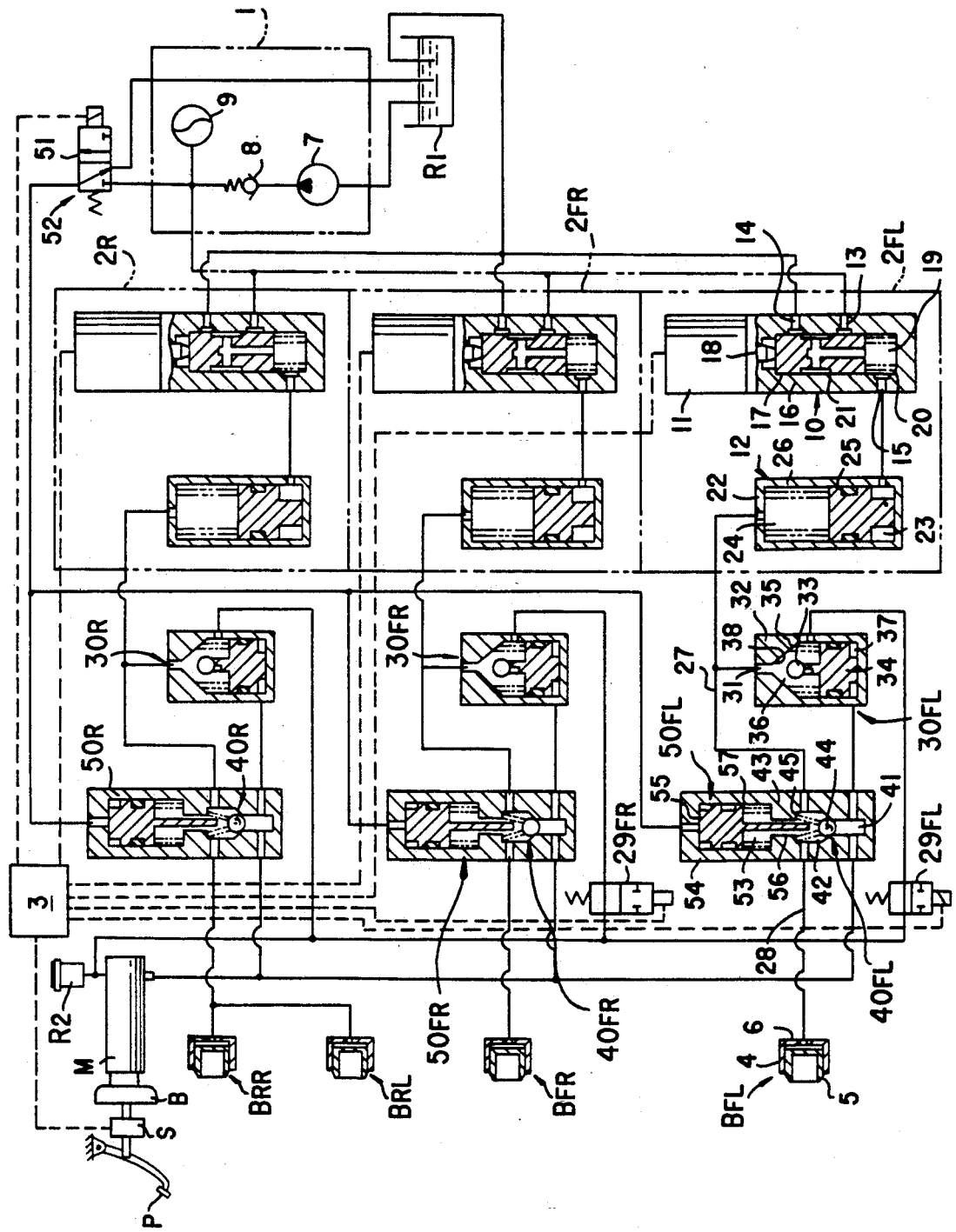

HYDRAULIC BRAKING PRESSURE CONTROL SYSTEM FOR VEHICLE

BACKGROUND OF THE INVENTION

1. Field of the Invention

The field of the present invention is hydraulic braking pressure control systems for vehicles, and particularly such hydraulic braking pressure control systems comprising a master cylinder operatively connected to a brake pedal, an operation-amount detector for detecting the amount by which the brake pedal is operated, a hydraulic pressure control unit for controlling the hydraulic pressure to be applied to a brake device mounted on a wheel in accordance with an applied quantity of electricity, and a control circuit for controlling the quantity of electricity to be applied to the hydraulic pressure control unit in accordance with a detection value provided by the operation-amount detector.

2. Related Art

Such a hydraulic braking pressure control system for vehicles is already known, for example, from Japanese Patent Application Laid-open No. 178062/89.

In the above prior art system, a precision hydraulic braking pressure control can be achieved by a simple construction; however, as the hydraulic pressure control unit may be operated by an electric actuator, it is feared that the electric actuator may be operated due to a fault in an electric system, when a braking operation is not desired.

SUMMARY OF THE INVENTION

Accordingly, it is an object of the present invention to provide a hydraulic braking pressure control system for a vehicle, wherein hydraulic braking pressure is prevented from being applied to the brake device when a braking manipulation is not conducted.

Thus according to the present invention there is provided a hydraulic braking pressure control system for a vehicle, comprising a master cylinder operatively connected to a brake pedal, an operation-amount detector for detecting the amount by which the brake pedal is operated, a hydraulic pressure control unit for controlling the hydraulic pressure to be applied-to a brake device mounted on a wheel, in accordance with an applied quantity of electricity, and a control circuit for controlling the quantity of electricity to be applied to the hydraulic pressure control unit in accordance with a detection value provided by the operation-amount detector, wherein the system further includes a cut-off valve adapted to be closed in response to depression of the brake pedal, and a reservoir connected through the cut-off valve to an oil passage connecting the hydraulic pressure control unit to the brake device.

With such a construction, the cut-off valve is open when the brake pedal is not depressed. Therefore, if a hydraulic pressure is delivered from the hydraulic pressure control unit when there is no braking manipulation, such hydraulic pressure is released into the reservoir, ensuring that any such hydraulic pressure is prevented from being applied to the brake device.

In a preferred form of the present invention the system further includes a one-way valve adapted to be opened in response to increasing of the output hydraulic pressure from the master cylinder to a level higher by at least a given value than the hydraulic pressure applied to the brake device, thereby causing communication between the brake device and the master cylinder. This arrangement ensures that the output hydraulic pressure from the master cylinder can be applied to the brake device if there is a fault in the hydraulic pressure control unit.

It is a further preferred feature of the invention that the system includes a traction-controlling shut-off means capable of providing a forced shutting-off between said cut-off valve corresponding to a driving wheel and the reservoir. This ensures that even if the cut-off valve is open during a traction control when there is no braking manipulation, the hydraulic pressure from the hydraulic pressure control unit can be applied to the brake device for the driving wheel.

BRIEF DESCRIPTION OF THE DRAWING

The drawing illustrates an embodiment of the present invention applied to a hydraulic braking pressure control system for a front wheel drive vehicle.

PREFERRED EMBODIMENT

An embodiment of the invention will now be described by way of example and with reference to the accompanying drawing, which is a hydraulic circuit diagram. The hydraulic braking pressure control system comprises a master cylinder M which produces a hydraulic braking pressure in response to depression of a brake pedal P, a depression force sensor S serving as a depression-amount detector for detecting the amount by which brake pedal P is depressed, a hydraulic pressure supply source 1, a left front wheel hydraulic pressure control unit $2_{FL}$ interposed between the supply source 1 and a left front wheel brake device $B_{FL}$ mounted on a left front wheel, which is a driving wheel, a right front wheel hydraulic pressure control unit $2_{FR}$ interposed between the supply source 1 and a right front wheel brake device $B_{FR}$ mounted on a right front wheel, which again is a driving wheel, a single rear wheel hydraulic pressure control unit $2_R$ interposed between the supply source 1 and left and right rear wheel brakes $B_{RL}$ and $B_{RR}$ mounted on left and right rear wheels, which are driven wheels, and a control circuit 3 comprising a computer for controlling the operation of each of the hydraulic pressure control units $2_{FL}$, $2_{FR}$ and $2_R$ in accordance with a detected value provided by the depression force sensor S.

The master cylinder M has a vacuum booster B at an input portion thereof, and the depression force sensor S is interposed between the brake pedal P and the vacuum booster B. Thus, the depression force on the brake pedal P, i.e. the amount by which brake pedal P is depressed, is detected by the depression force sensor S, and a detection value thereof is supplied to the control circuit 3.

Each of the brake devices $B_{FL}$, $B_{FR}$, $B_{RL}$ and $B_{RR}$ comprises a cylinder 4 with a piston 5 slidable therein, so that a braking force is generated by movement of the piston 5 according to a hydraulic braking pressure supplied to a hydraulic braking pressure chamber 6 which is defined between the cylinder 4 and the piston 5.

The hydraulic pressure supply source 1 comprises a hydraulic pump 7 for pumping working oil from a reservoir $R_1$, and an accumulator 9 connected to the hydraulic pump 7 with a check valve 8 interposed therebetween.

The left front wheel hydraulic pressure control unit $2_{FL}$, the right front wheel hydraulic pressure control unit $2_{FR}$, and the rear wheel hydraulic pressure control unit $2_R$, basically have the same construction, and hence only the construction of the control unit $2_{FL}$ will be described below in detail.

The control unit $2_{FL}$ comprises a hydraulic pressure control valve 10, a linear solenoid 11 serving as an electric actuator for operating the valve 10, and a hydraulic pressure transmitting mechanism 12.

The hydraulic pressure control valve 10 is comprised of a spool 17 which is slidably received in a first housing 16 having an input port 13 leading to the hydraulic pressure supply source 1, a release port 14 leading to the reservoir $R_1$, and an output port 15, so that the output port 15 communicates with either the input port 13 or the release port 14 in accordance with the axial movement of the spool 17. The linear solenoid 11 is connected to one end of the first housing 16.

The linear solenoid 11 serves to produce a thrust force according to an electric input quantity and has a drive rod 18 coaxially abutting against one end of the spool 17. An output hydraulic chamber 19 is defined in a facing relation to the other end of the spool 17 and leads to the output port 15, so that hydraulic pressure in chamber 19 opposes a thrust force applied to the spool 17 from the drive rod 18, and a return spring 20 is contained in the chamber 19 for biasing the spool 17 in a direction to increase the volume of the chamber 19. Thus, the drive rod 18 is normally in abutment against the one end of the spool 17, and the spool 17 and the linear solenoid 11 are thus operatively connected to each other.

An annular groove 21 is provided in an outer surface of the spool 17 at its intermediate portion and communicates with the output hydraulic pressure chamber 19 by way of an axial bore. The spool 17 is movable axially between a hydraulic pressure applying position in which the annular groove 21 leading to the chamber 19 is put into communication with the input port 13 to permit a hydraulic pressure from the hydraulic pressure source 1 to be applied to the chamber 19, and a hydraulic pressure releasing position in which the annular groove 21 is put into communication with the release port 14 to cause the communication of the chamber 19 with the reservoir $R_1$. The thrust force of the linear solenoid 11 urges the spool 17 toward the hydraulic pressure applying position, whilst a hydraulic pressure in the output hydraulic pressure chamber 19 and the spring force of the return spring 20 are applied to the spool 17 to urge it toward the hydraulic pressure releasing position.

The linear solenoid 11 generates a thrust force according to an energizing current quantity or according to a voltage when a resistance is constant, and in a certain stroke range the linear solenoid 11 generates a thrust force proportional to the energizing current quantity. Depending upon a magnitude relationship between such a thrust force, the hydraulic pressure in the output hydraulic pressure chamber 19, and the spring force of the return spring 20, the axial movement of the spool 17 causes the hydraulic pressure from the hydraulic pressure supply source 1 to be applied to the output hydraulic pressure chamber 19 or causes the hydraulic pressure in the chamber 19 to be released, whereby the hydraulic pressure from the supply source 1 is controlled in proportion with the energizing current for the linear solenoid 11 and delivered through the output port 15.

The energizing current for the linear solenoid 11 is controlled by the control circuit 3 which controls the energizing current quantity in accordance with the detection value provided by the depression force sensor S during a normal braking operation.

The hydraulic pressure transmitting mechanism 12 comprises a second cylindrical housing 22 with its opposite ends closed, a free piston 25 slidably received in the housing 22 with one end facing an input chamber 23 and the other end facing an output chamber 24, and a return spring 26 contained in the output chamber 24 to produce a spring force for biasing the free piston 25 toward the input chamber 23. The input chamber 23 is connected to the output port 15 in the hydraulic pressure control valve 10.

The hydraulic pressure transmitting mechanism 12 delivers a hydraulic pressure corresponding to an output hydraulic pressure from the hydraulic pressure control valve 10, out of the output chamber 24 by movement of the free piston 25 toward the output chamber 24 in accordance with a hydraulic pressure delivered from the control valve 10. Oil passages 27 and 28 leading to the output chamber 24 are connected to the hydraulic pressure chamber 6 in the brake device $B_{FL}$. Thus, the hydraulic pressure transmitting mechanism 12 serves to isolate the working oil closer to the brake device $B_{FL}$ from the working oil closer to the hydraulic pressure control valve 10.

A reservoir $R_2$ associated with the master cylinder M is connected between the left front wheel hydraulic pressure control unit $2_{FL}$ and the left front wheel brake device $B_{FL}$ through a solenoid operated directional control valve $29_{FL}$ and a cut-off valve $30_{FL}$; between the right front wheel hydraulic pressure control unit $2_{FR}$ and the right front wheel brake device $B_{FR}$ through a solenoid operated directional control valve $29_{FR}$ and a cut-off valve $30_{FR}$; and between the rear wheel hydraulic pressure control unit $2_R$ and both of the rear wheel brake device $B_{RL}$ and $B_{RR}$ through a cut off valve $30_R$.

The cut-off valves $30_{FL}$, $30_{FR}$ and $30_R$ have basically the same construction and hence only the construction of the cut-off valve $30_{FL}$ will be described below in detail.

The cut-off valve $30_{FL}$ comprises a third cylindrical housing 32 having a valve bore 31 leading to the oil passage 27 at one end and with its opposite end closed, a piston 34 slidably received in the third housing 32 and having a valve sphere 33 capable of closing the valve bore 31, and a return spring 35 for biasing the piston 34 in a valve-opening direction.

A valve chest 36 is defined between the piston 34 and one end of the third housing 32, and a hydraulic pressure chamber 37 is defined between the piston 34 and the other end of the housing 32. A tapered valve seat 38 leading to the valve bore 31 is formed in an inner surface of one end wall facing the valve chest 36 in the housing 32, and the valve sphere 33 is adapted to seat on the valve seat 38 to close the valve bore 31. The return spring 35 is contained within the valve chest 36.

The valve chest 36 is connected to the reservoir $R_2$ through the solenoid operated directional control valve $29_{FL}$, and the hydraulic pressure chamber 37 communicates with the master cylinder M. Thus, when a hydraulic pressure is delivered from the master cylinder M, the piston 34 is moved in a direction to reduce the volume of the valve chest 36 by the hydraulic pressure applied to the hydraulic pressure chamber 37 against the spring force of the return spring 35, thereby causing the valve sphere 33 to seat on the valve seat 38 to close the valve bore 31. On the other hand, in a condition in which no hydraulic pressure is delivered from the master cylinder M, the piston 34 is moved in a direction to displace the valve sphere 33 away from the valve seat 38 under the action of the spring force of the return spring 35, thereby permitting the valve chest 36 to be put into communication with the oil passage 27.

The solenoid operated directional control valves $29_{FL}$ and $29_{FR}$ are normally open solenoid valves which are disposed in correspondence to the driving wheels, i.e. the left and right front wheels, to function as traction-controlling shut-off means, respectively, and are controlled for switchover between energization and deenergization by the control circuit 3. In a condition in which the solenoid operated directional control valve $29_{FL}$ is in deenergization and moreover during non-braking, i.e. in a condition in which no hydraulic pressure is delivered from the master cylinder M, the oil passage 27 leads to the reservoir $R_2$ through the cut-off valve $30_{FL}$.

A one-way valve $40_{FL}$ is interposed between the left front wheel brake device $B_{FL}$ and the master cylinder M, and a one-way valve $40_{FR}$ is interposed between the right front wheel brake device $B_{FR}$ and the master cylinder. Further, a one-way valve $40_R$ is interposed between the left and right rear wheel brake devices $B_{RL}$ and $B_{RR}$ and the master cylinder. The one-way valves $40_{FL}$, $40_{FR}$ and $40_R$ have basically the same construction, and hence only the construction of the one-way valve $40_{FL}$ will be described below.

The one-way valve $40_{FL}$ applies an output hydraulic pressure from the master cylinder M to the left front wheel brake device $B_{FL}$ in response to an increase of the output hydraulic pressure from the master cylinder M to a level higher by at least a given value than the hydraulic pressure applied to the left front wheel brake device $B_{FL}$, and comprises a fourth housing 43 including a valve bore 41 leading to the master cylinder M and a valve chest 42 leading to the hydraulic braking pressure chamber 6 in the left front wheel brake device $B_{FL}$ via the oil passage 28, a valve sphere 44 contained in the valve chest 42 to open and close the valve bore 41, and a spring 45 contained in the valve chest 42 for biasing the valve sphere 44 in a valve-closing direction.

Such one-way valve $40_{FL}$ is opened in response to an increase of the hydraulic pressure applied to the valve sphere 44 in a valve-opening direction by the hydraulic pressure applied to the valve bore 41, i.e. the output hydraulic pressure from the master cylinder M, to a level higher than the hydraulic pressure in the valve chest 42, i.e. the hydraulic pressure applied to the valve sphere 44 in a valve-closing direction by the hydraulic pressure applied to the left front wheel brake device $B_{FL}$, and the spring force of the spring 45.

Locking mechanisms $50_{FL}$, $50_{FR}$ and $50_R$ are provided in fourth housings 43 of the one-way valves $40_{FL}$, $40_{FR}$ and $40_R$ for forcedly maintaining those one-way valves closed, respectively. An anti-lock brake locking means 52 is provided by the locking mechanisms $50_{FL}$, $50_{FR}$ and $50_R$ and a single solenoid operated directional control valve 51.

The locking mechanisms $50_{FL}$, $50_{FR}$ and $50_R$ have basically the same construction, and hence only the construction of the locking mechanism $50_{FL}$ will be described below.

The locking mechanism $50_{FL}$ comprises a piston 55 slidably received in the fourth housing 43 with one end facing a spring chamber 53 leading to the valve chest 42 and the other end facing a hydraulic pressure chamber 54, an urging rod 56 integrally provided on the piston 55 for movement into abutment against the valve sphere 44 of the one-way valve $40_{FL}$, and a spring 57 contained in the spring chamber 53.

The urging rod 56 has such a length that when the piston 55 is in a retreat limit position closer to the hydraulic pressure chamber 54, the urging rod 56 is not in abutment against the valve sphere 44, but when the piston 55 is advanced against a spring force of the spring 57 in response to application of hydraulic pressure to the hydraulic pressure chamber 54, the urging rod 56 is caused to abut against the valve sphere 44 to urge the valve sphere 44 to a valve-closing position.

The solenoid operated direction control valve 51 is interposed between the hydraulic pressure chamber 54 of each of the locking mechanisms $50_{FL}$, $50_{FR}$ and $50_R$ and the hydraulic pressure supply source 1 as well as the reservoir $R_1$ and is switchable between a position in which it puts the hydraulic pressure chambers 54 into communication with the reservoir $R_1$ in a deenergized condition and a position in which it puts the hydraulic pressure chambers 54 into communication with the hydraulic pressure supply source 1 in an energized condition. The deenergization and energization of the solenoid operated directional control valve 51 are controlled in a switched manner by the control circuit 3.

The operation of this embodiment will now be described. During normal operation, the solenoid operated directional control valves $29_{FL}$ and $29_{FR}$ are deenergized, i.e. in communication states, while the solenoid operated directional control valve 51 is also deenergized to permit communication of the hydraulic pressure chambers 54 with the reservoir $R_1$. If the brake pedal P is depressed to effect braking in such a condition, the depression force on the brake pedal P is detected by the depression force sensor S, and the linear solenoid 11 is energized by an energizing current according to the detection value, thereby causing a hydraulic pressure corresponding to such depression force to be delivered from each of the hydraulic pressure control units $2_{FL}$, $2_{FR}$ and $2_R$. In addition, each of the cut-off valves $30_{FL}$, $30_{FR}$ and $30_R$ is closed in response to application of the hydraulic pressure delivered from the master cylinder M to the hydraulic pressure chamber 37. Thus, the hydraulic pressure from each of the hydraulic pressure control units $2_{FL}$, $2_{FR}$ and $2_R$ is applied to a corresponding one of the brake devices $B_{FL}$, $B_{FR}$, $B_{RL}$ and $B_{RR}$ to provide a braking force.

If a wheel is about to become locked during such a braking (which is detected by means which do not form part of this invention), the solenoid operated directional control valve 51 is energized by the control circuit 3, causing the hydraulic pressure from the hydraulic pressure supply source 1 to be applied to the hydraulic pressure chamber 54 in each of the locking mechanisms $50_{FL}$, $50_{FR}$ and $50_R$, thereby forcedly bringing each of the one-way valves $40_{FL}$, $40_{FR}$ and $40_R$ into a closed state. In addition, the energizing current for the linear solenoid 11 in the hydraulic pressure control unit corresponding to the wheel which is about to enter a locked state is controlled to a smaller level by the control circuit 3, thereby reducing the hydraulic braking pressure in the brake device for the wheel which is about to enter the locked state, and thus preventing the wheel from entering the locked state.

Suppose that the driving or front wheels are subject to excessive slippage during travelling of the vehicle in a non-braking condition. In this case, the solenoid operated directional control valves $29_{FL}$ and $29_{FR}$ are energized, and the linear solenoids 11 in the hydraulic pressure control units $2_{FL}$ and $2_{FR}$ corresponding to the front wheels are also energized, again by means not forming part of this invention. Because no hydraulic pressure is delivered from the master cylinder M, the cut-off valves $30_{FL}$, $30_{FR}$ and $30_R$ are open, the solenoid operated directional control valves $29_{FL}$ and $29_{FR}$ are closed by energization. Therefore, the communication between the oil passage 27 and the reservoir $R_2$ is cut off. Thus, the hydraulic pressure delivered from each of the hydraulic pressure control units $2_{FL}$ and $2_{FR}$ corresponding to the front wheels is applied to both of the front wheel brake devices $B_{FL}$ and $B_{FR}$ by energization of the linear solenoids 11, so that the hydraulic pressure in each of the hydraulic braking pressure chambers 6 in the front wheel brake devices $B_{FL}$ and $B_{FR}$ is increased notwithstanding the fact that the brake pedal P is not depressed. This causes a braking force to be applied to the front wheels, thereby reducing the driving force to enable the elimination of the excessive slippage.

Suppose that the hydraulic pressure in the hydraulic pressure supply source 1 becomes abnormally reduced during braking. In this case, the solenoid operated directional control valve 51 is in deenergization except during a traction control, thus putting the hydraulic pressure chamber 54 into communication with the reservoir $R_1$. Therefore, the one-way valves $40_{FL}$, $40_{FR}$ and $40_R$ can be opened, and hydraulic pressure cannot be delivered from the hydraulic pressure control units $2_{FL}$, $2_{FR}$ and $2_R$, but hydraulic pressure from the master cylinder M can be applied to the brake devices $B_{FL}$, $B_{FR}$, $B_{RL}$ and $B_{RR}$ via the one-way valves $40_{FL}$, $40_{FR}$ and $40_R$ to provide a braking force.

Further, suppose that the linear solenoid 11 is accidentally operated due to a fault in an electric system including the control circuit 3 and the linear solenoid 11 when there is no braking operation, permitting a hydraulic pressure to be delivered from the hydraulic pressure control units $2_{FL}$, $2_{FR}$ and $2_R$. In this case, no hydraulic pressure is delivered from the master cylinder M, the cut-off valves $30_{FL}$, $30_{FR}$ and $30_R$ are open, and the solenoid operated directional control valves $29_{FL}$ and $29_{FR}$ are in deenergization. Therefore, the oil passage 27 is in communication with the reservoir $R_2$, so that any hydraulic pressure delivered from each of the solenoid operated directional control valves $29_{FL}$ and $29_{FR}$ escapes into the reservoir $R_2$, ensuring that hydraulic braking pressure cannot be applied to the brake devices $B_{FL}$, $B_{FR}$, $B_{RL}$ and $B_{RR}$.

We claim:

1. A hydraulic braking pressure system for a vehicle comprising:
    a master cylinder operatively connected to a brake pedal;
    an operation-amount detector for detecting the amount by which the brake pedal is operated;
    a hydraulic pressure control unit for controlling the hydraulic pressure to be applied to a brake device mounted on a wheel, in accordance with an applied quantity of electricity; and
    a control circuit for controlling the quantity of electricity to be applied to the hydraulic pressure control unit in accordance with a detection value provided by said operation-amount detector;
    wherein said system further includes a cut-off valve which is closed in response to depression of the brake pedal and is open in a non-braking condition, and a reservoir connected through said cut-off valve to an oil passage connecting the hydraulic pressure control unit and the brake device.

2. A system according to claim 1, wherein said hydraulic pressure control unit comprises a hydraulic pressure control valve interposed between a hydraulic pressure supply source and the brake device, and an electric actuator for actuating said hydraulic pressure control valve.

3. A system according to claim 2, further including a one-way valve which is opened in response to increasing of the output hydraulic pressure from the master cylinder to a level higher by at least a given value than the hydraulic pressure applied to the brake device, thereby causing communication between the brake device and the master cylinder.

4. A system according to claim 3, further including an anti-lock brake locking means capable of forcedly maintaining said one-way valve closed.

5. A system according to claim 1, further including a traction-controlling shut-off means which provides a forced shutting-off between said cut-off valve corresponding to a driving wheel and the reservoir.

6. A hydraulic braking pressure control system for a vehicle, comprising:
    a master cylinder operatively connected to a brake pedal and having an output port for delivering an output hydraulic pressure;
    said output port communicated with a brake device mounted on a wheel;
    an operation-amount detector for detecting the amount by which the brake pedal is operated;
    a hydraulic pressure control unit for controlling a hydraulic pressure to be applied to the brake device in accordance with an applied quantity of electricity;
    a control circuit for controlling the quantity of electricity to be applied to the hydraulic pressure control unit in accordance with a detection value provided by the operation-amount detector;
    a reservoir connected to an oil passage connecting the hydraulic pressure control unit and the brake device;
    a cut-off valve interposed between the reservoir and the oil passage and closed in response to depression of the brake pedal, said cut-off valve being open in a non-braking condition;
    a one-way valve provided between the output port of the master cylinder and the brake device; and
    said one-way valve being urged in an opening direction by the output hydraulic pressure from the master cylinder while being urged in a closing direction by the controlled hydraulic pressure from the hydraulic pressure control unit, so that said one-way valve is opened in response to increasing of the output hydraulic pressure from the master cylinder to a level higher by at least a given value than the hydraulic pressure from the hydraulic pressure control unit, thereby permitting the output hydraulic pressure from the master cylinder to be applied to the brake device.

* * * * *